United States Patent
Ogihara

(10) Patent No.: US 11,151,084 B2
(45) Date of Patent: Oct. 19, 2021

(54) DATA ANALYSIS APPARATUS, DATA ANALYSIS METHOD, AND STORAGE MEDIUM

(71) Applicant: FUJITSU LIMITED, Kawasaki (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 16/027,427

(22) Filed: Jul. 5, 2018

(65) Prior Publication Data
US 2019/0042589 A1 Feb. 7, 2019

(30) Foreign Application Priority Data
Aug. 3, 2017 (JP) .............................. JP2017-150557

(51) Int. Cl.
*G06F 16/10* (2019.01)
*G06F 16/16* (2019.01)
*G06F 16/11* (2019.01)

(52) U.S. Cl.
CPC .......... *G06F 16/166* (2019.01); *G06F 16/122* (2019.01)

(58) Field of Classification Search
None
See application file for complete search history.

(56) References Cited

U.S. PATENT DOCUMENTS

| | | | | |
|---|---|---|---|---|
| 8,510,304 B1* | 8/2013 | Briggs | ................... | G06F 16/22 707/736 |
| 9,043,278 B1* | 5/2015 | Wilson | ................... | G06F 16/27 707/626 |
| 2004/0249783 A1* | 12/2004 | Best | ...................... | G06F 16/955 |
| 2010/0042603 A1* | 2/2010 | Smyros | ................. | G06F 16/338 707/711 |
| 2013/0185346 A1* | 7/2013 | Lee | ..................... | H04L 67/1095 709/201 |
| 2013/0204890 A1* | 8/2013 | Kamekawa | ............. | G06F 16/93 707/758 |
| 2014/0093175 A1* | 4/2014 | Morimoto | .......... | G06K 9/00221 382/195 |

(Continued)

FOREIGN PATENT DOCUMENTS

| | | |
|---|---|---|
| JP | 2003-143251 | 5/2003 |
| JP | 2006-222814 | 8/2006 |

*Primary Examiner* — Jau Shya Meng
(74) *Attorney, Agent, or Firm* — Fujitsu Patent Center

(57) ABSTRACT

A non-transitory computer-readable storage medium having stored therein a program executing a process includes when starting capture of data, acquiring a pair of first identification information and a file name; recording the pair and an acquisition time in management information; when it is detected that the first identification information included in the captured data is associated with a file name included in another data captured before the captured data, recording a pair of the first identification information and the file name and a capture time in the management information; when a reference request for the data is received, specifying a file name corresponding to first identification information and time information included in the reference request, the file name being specified by referring to the management information; converting the first identification information into the specified file name, the first identification information being included in the data; and outputting the data.

16 Claims, 20 Drawing Sheets

(56) References Cited

U.S. PATENT DOCUMENTS

| | | | |
|---|---|---|---|
| 2014/0115705 A1* | 4/2014 | Fujishima | H04L 43/18 |
| | | | 726/23 |
| 2015/0106346 A1* | 4/2015 | Grove | G06F 16/219 |
| | | | 707/695 |
| 2015/0201036 A1* | 7/2015 | Nishiki | H04L 67/2871 |
| | | | 709/224 |
| 2015/0222730 A1* | 8/2015 | Gower | H04L 67/42 |
| | | | 709/203 |

\* cited by examiner

FIG. 3

```
A→B : OPEN    "ABC"
B→A : FID     0x123456
A→B : READ    0x123456  0  128
B→A : "ABCDEFGHIJ···"
              .
              .
              .
A→B : CLOSE   0x123456
B→A : CLOSE   OK
```

FIG. 4

| CAPTURE TIME | TRANSMISSION SOURCE → TRANSMISSION DESTINATION | I/O TYPE | FILE ID | OFFSET | ACCESS LENGTH |
|---|---|---|---|---|---|
| 10:02:21 | A → B | READ | 0x1212 | 0 | 128 |
| 10:03:10 | A → B | READ | 0x1212 | 512 | 128 |
| 10:04:11 | A → B | WRITE | 0x2521 | 1024 | 4096 |
| 12:05:22 | A → B | READ | 0x1212 | 1024 | 128 |
| 12:06:31 | A → B | READ | 0x1212 | 2048 | 128 |

FIG. 5

| CAPTURE TIME | TRANSMISSION SOURCE → TRANSMISSION DESTINATION | I/O TYPE | FILE NAME | OFFSET | ACCESS LENGTH |
|---|---|---|---|---|---|
| 10:02:21 | A → B | READ | AAAAA | 0 | 128 |
| 10:03:10 | A → B | READ | AAAAA | 512 | 128 |
| 10:04:11 | A → B | WRITE | BBBBB | 1024 | 4096 |
| 12:05:22 | A → B | READ | CCCCC | 1024 | 128 |
| 12:06:31 | A → B | READ | CCCCC | 2048 | 128 |
| ⋮ | | | | | |

FIG. 6

| FILE NAME | FILE ID | FILE SERVER ID | TIME |
|---|---|---|---|
| AAAAA | 0x1212 | 192.168.0.1 | 10:00 |
| BBBBB | 0x2521 | 192.168.0.1 | 10:00 |
| DDDDD | 0x5695 | 192.168.0.1 | 10:00 |

FIG. 7

| FILE NAME | FILE ID | FILE SERVER ID | TIME |
|---|---|---|---|
| AAAAA | 0x1212 | 192.168.0.1 | 10:00 |
| BBBBB | 0x2521 | 192.168.0.1 | 10:00 |
| BBBBB | 0x3105 | 192.168.0.1 | 11:00 |
| CCCCC | 0x1212 | 192.168.0.1 | 12:00 |
| DDDDD | 0x5695 | 192.168.0.1 | 10:00 |

ADDED ENTRY

FIG. 13

| FILE NAME | FILE ID | CLIENT ID | TIME |
|---|---|---|---|
| AAAAA | 0x1212 | 192.168.0.2 | 10:00 |
| BBBBB | 0x2521 | 192.168.0.2 | 10:00 |
| BBBBB | 0x3105 | 192.168.0.2 | 11:00 |
| CCCCC | 0x1212 | 192.168.0.2 | 12:00 |
| DDDDD | 0x5695 | 192.168.0.2 | 10:00 |

FIG. 16

```
A→B : READ  0123456     0   1024
B→A : "AAAAA···"
A→B : READ  0123456  1024    128
B→A : "BBBBB···"
A→B : READ  0123456  2048    256
B→A : "CCCCC···"
```

FIG. 18

| FILE NAME | FILE ID | FILE SERVER UD | REGISTRATION TIME | ASSOCIATION END TIME |
|---|---|---|---|---|
| AAAAA | 0x1212 | 192.168.0.1 | 10:00 | 11 : 21 |
| BBBBB | 0x2521 | 192.168.0.1 | 10:00 | 10 : 36 |
| BBBBB | 0x3105 | 192.168.0.1 | 11:00 | |
| CCCCC | 0x1212 | 192.168.0.1 | 12:00 | |
| DDDDD | 0x5695 | 192.168.0.1 | 10:00 | |

DATA ANALYSIS APPARATUS, DATA ANALYSIS METHOD, AND STORAGE MEDIUM

CROSS-REFERENCE TO RELATED APPLICATION

This application is based upon and claims the benefit of priority of the prior Japanese Patent Application No. 2017-150557, filed on Aug. 3, 2017, the entire contents of which are incorporated herein by reference.

FIELD

The embodiments discussed herein are related to a data analysis apparatus, a data analysis method, and a storage medium.

BACKGROUND

A technique is used in which a client terminal mounts, for use, a file stored in a file server. Communication between the client terminal and the file server may be monitored.

In the related art, a technique has been proposed in which packets are captured to extract the user name and the address of the transmission source terminal of the packets (for example, see Japanese Laid-open Patent Publication No. 2006-222814).

In the related art, a technique has been proposed in which, while variable-length packets are measured online, the data is displayed in real time (for example, see Japanese Laid-open Patent Publication No. 2003-143251).

For example, in transmission of a file from a file server to a client terminal, data including the file ID is transmitted on a packet-by-packet basis. When file transmission is started, data including the file name may be transmitted.

However, depending on a timing of start of capture, a server which captures data may fail to capture data including the file name, resulting in failure to specify the file name corresponding to the file ID. For example, an administrator may have difficulty in grasping the system state because the file name is not displayed when the administrator refers to the captured data. In view of the description above, it is desirable that the file name corresponding to captured data be specified independently of a timing of start of capture.

SUMMARY

According to an aspect of the invention, a non-transitory computer-readable storage medium having stored therein a program for analyzing data, the program executing a process includes when starting capture of data of at least one file, acquiring a pair of first identification information and a file name of a file, the first identification information being used to identify the file; recording the pair and an acquisition time of the pair in management information stored in a memory; when, in the capture of data, it is detected that the first identification information included in the captured data is associated with a file name included in another data, the another data being captured before the captured data, recording a pair of the first identification information and the file name and a capture time in the management information; when a reference request for the data is received, specifying a file name corresponding to first identification information and time information which are included in the reference request, the file name being specified by referring to the management information in the memory; converting the first identification information into the specified file name, the first identification information being included in the data; and outputting the data in which the first identification information is converted into the file name.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating exemplary data in packets;

FIG. 4 is a diagram illustrating exemplary data stored in a storage unit;

FIG. 5 is a diagram illustrating exemplary data transmitted in response to a reference request;

FIG. 6 is a diagram illustrating exemplary management information obtained when capture is to be started, according to a first embodiment;

FIG. 7 is a diagram illustrating exemplary management information obtained after start of capture according to the first embodiment;

FIG. 13 is a diagram illustrating exemplary management information according to the second embodiment;

FIG. 16 is a diagram illustrating exemplary access in accordance with a given pattern according to the third embodiment;

FIG. 18 is a diagram illustrating exemplary management information according to the fourth embodiment;

DESCRIPTION OF EMBODIMENTS

Exemplary Overall Configuration of a System according to Embodiments

Figure 1:
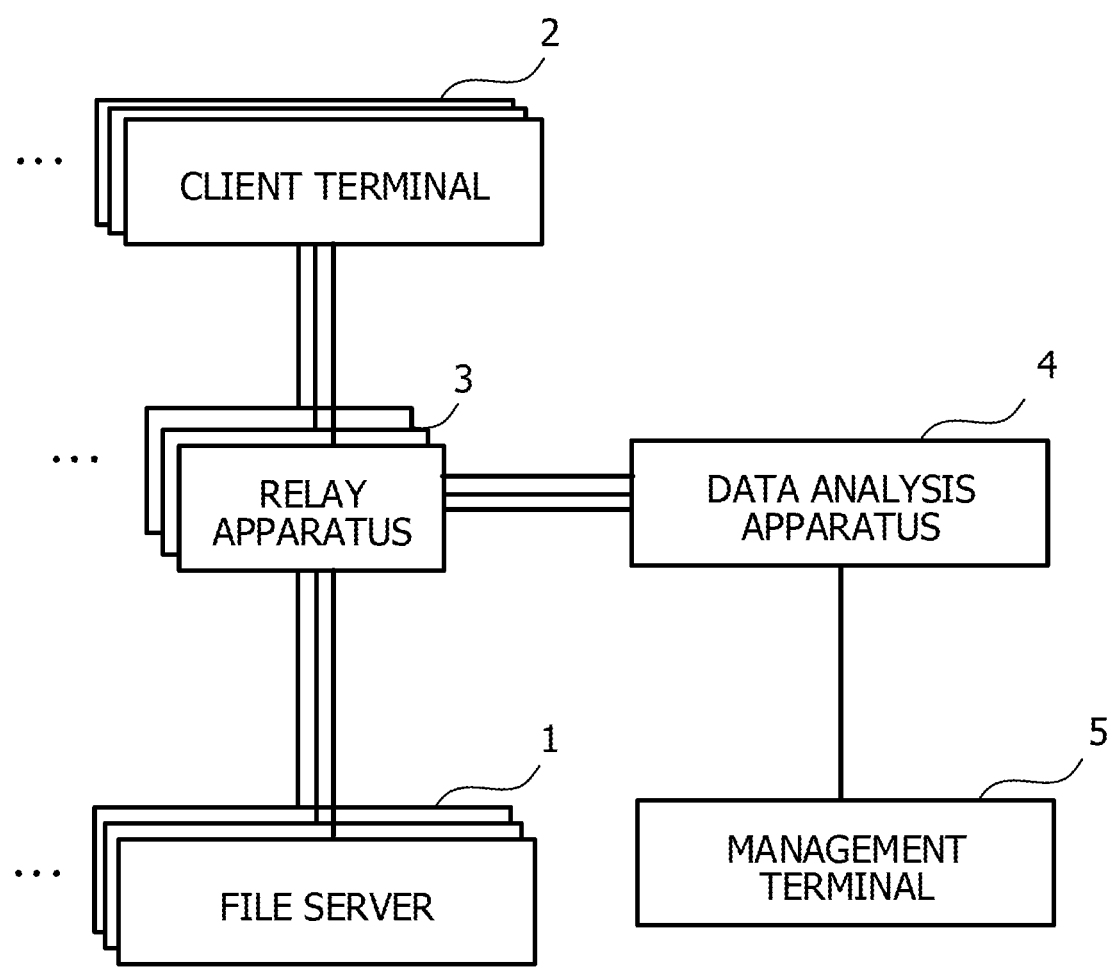
FIG. 1 is a diagram illustrating an exemplary overall configuration of a system according to an embodiment.

Embodiments will be described below by referring to the drawings. FIG. 1 illustrates an exemplary overall configuration of a system according to the embodiments. The system according to the embodiments includes a file server(s) 1, a client terminal(s) 2, a relay apparatus(es) 3, a data analysis apparatus 4, and a management terminal 5.

The file server 1 stores files available to users. The file server 1 may store correspondence information indicating correspondences between file Identifications (IDs) and file names. When the file server 1 receives, from the client terminal 2, a request for referring to a file, the file server 1 divides the file into multiple packets, and transmits the divided data to the client terminal 2.

In the description below, data transmitted on a packet-by-packet basis may be simply referred to as "packets".

The client terminal 2 is capable of communicating with the file server 1, and is operated by a user who uses the file server 1. The client terminal 2 receives packets from the file server 1 via the relay apparatus 3. Thus, files stored in the file server 1 are mounted. The client terminal 2 is provided, for example, with a virtual server which uses the mounted files as a virtual disk.

For example, the Network File System (NFS) is used for communication between the file server 1 and the client terminal 2. For example, a file handler is used as the file ID.

The relay apparatus 3 relays communications between the file server 1 and the client terminal 2. The relay apparatus 3 is provided, for example, with a mirroring function. The relay apparatus 3 mirrors packets between the file server 1 and the client terminal 2, and transmits the packets to the data analysis apparatus 4.

The data analysis apparatus 4 uses the mirroring function of the relay apparatus 3 to capture the packets transmitted between the file server 1 and the client terminal 2. The data analysis apparatus 4 is an exemplary computer.

The management terminal 5 refers to the data captured by the data analysis apparatus 4. In referring to the data captured by the data analysis apparatus 4, the management terminal 5 transmits, to the data analysis apparatus 4, a reference request including a time range in which data is to be referred to.

For example, a network tap may be disposed between the file server 1 and the client terminal 2. The data analysis apparatus 4 may use the network tap to capture the packets transmitted between the file server 1 and the client terminal 2.

In the system according the embodiments, multiple sets of a file server 1, a client terminal 2, and a relay apparatus 3 may be present, or a single set may be present.

Exemplary Data Analysis Apparatus

Figure 2:
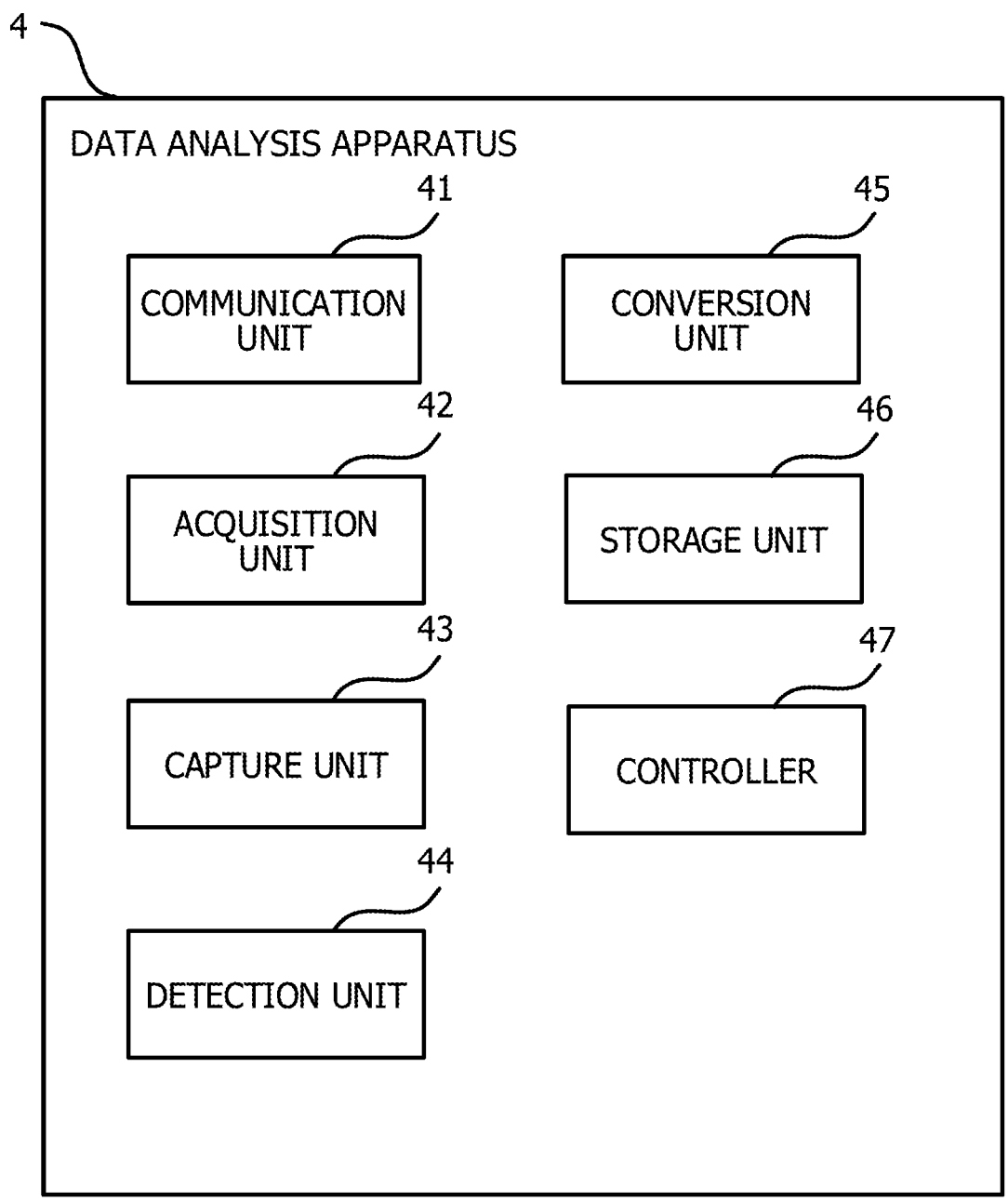
FIG. 2 is a diagram illustrating an exemplary data analysis apparatus.

FIG. 2 is a diagram illustrating an exemplary data analysis apparatus 4. The data analysis apparatus 4 includes a communication unit 41, an acquisition unit 42, a capture unit 43, a detection unit 44, a conversion unit 45, a storage unit 46, and a controller 47.

The communication unit 41 receives, from the relay apparatus 3, the packets transmitted between the file server 1 and the client terminal 2. The communication unit 41 receives, from the file server 1 or the client terminal 2, a list of pairs of a file ID and a file name. The communication unit 41 receives, from the management terminal 5, a reference request for referring to data in the storage unit 46. The communication unit 41 transmits, to the management terminal 5, reference target data which is a response to the reference request and in which file IDs are converted into file names.

When capture of packets of files is to be started, the acquisition unit 42 obtains pairs of a file name and first identification information for identifying the file, and records, in the storage unit 46, management information including the pairs and the acquisition time at which the pairs are acquired. The first identification information indicates, for example, a file ID.

The capture unit 43 captures the packets transmitted between the file server 1 and the client terminal 2 by using the mirroring function of the relay apparatus 3.

In capture of packets, if the detection unit 44 detects that first identification information and a file name which are included in the captured packets are associated with each other, the detection unit 44 records, in the management information, the pair of the first identification information and the file name and the capture time at which the pair is captured.

Upon reception of a reference request for referring to data in the storage unit 46, the conversion unit 45 refers to the management information in the storage unit 46, and specifies the file name corresponding to the first identification information and the time information which are included in the reference request. The time information is, for example, a time range. The conversion unit 45 converts the first identification information included in the reference target data into the specified file name. The conversion unit 45 converts data, which is stored in each packet, into a format in which the data may be referred to. The reference target data is, for example, data in the packets captured in the time range specified in the reference request, among data stored in the storage unit 46.

The storage unit 46 stores data in the packets captured by the capture unit 43. The storage unit 46 stores the management information.

The controller 47 performs various control operations in the data analysis apparatus 4.

Exemplary Data in Packets

FIG. 3 is a diagram illustrating exemplary data in packets. In the data illustrated in FIG. 3, "A" represents identification information of the client terminal 2; and "B" represents identification information of the file server 1. Identification information of the file server 1 and that of the client terminal 2 are, for example, Internet Protocol (IP) addresses or media access control (MAC) addresses.

The data 'OPEN "ABC"' indicates an instruction to open a file whose name is "ABC". The data "FID 0x123456" is data for transmitting the file ID "0x123456", as a response to the instruction to open a file. After the message about the file ID is transmitted, the file ID is used in instructions on the file.

For example, the detection unit 44 detects that the file ID "0x123456" is associated with the file name "ABC" based on the data 'OPEN "ABC"' and the data "FID 0x123456". For example, a corresponding transaction ID may be given to each data. When the same transaction ID is given to pieces of data, the detection unit 44 may determine that the pieces of data are associated with each other.

The data "READ 0x123456 0 128" indicates an instruction to read 128-byte data from the file whose file ID is "0x123456", by using the 0-byte position as a start position. That is, "0" indicates an offset, and "128" indicates an access length. The data "ABCDEFGHIJ . . . " is data transmitted in response to the instruction to read data. That is, the data "ABCDEFGHIJ . . . " is 128-byte data which is read from the file whose file ID is "0x123456", by using the 0-byte position as a start position.

The data "CLOSE 0x123456" is an instruction to close the file whose file ID is "0x123456". The data "CLOSE OK" is data for transmitting a notification, as a response to the instruction to close a file, indicating that the instruction has been accepted.

The data format of packets is not limited to the format illustrated in FIG. 3.

Exemplary Data Stored in the Storage Unit 46

FIG. 4 is a diagram illustrating exemplary data stored in the storage unit 46. As illustrated in FIG. 4, data stored in the storage unit 46 includes the capture time, identification information of the transmission source and the transmission destination, the input/output (I/O) type, the file ID, the offset, and the access length. As illustrated in FIG. 4, in the data stored in the storage unit 46, the capture time is given to the captured data. The identification information of the transmission source and the transmission destination may be the IP addresses or the MAC addresses of the file server 1 and the client terminal 2.

As illustrated in FIG. 4, data stored in the storage unit 46 includes the file ID, but does not include the file name. Therefore, when an administrator refers to the data as it is, the administrator has difficulty in recognizing which data indicates which file.

FIG. 5 is a diagram illustrating exemplary data transmitted in response to a reference request. As illustrated in FIG. 5, data transmitted in response to a reference request includes the capture time, identification information of the transmission source and the transmission destination, the I/O type, the file name, the offset, and the access length.

The example illustrated in FIG. 5 is different from the data illustrated in FIG. 4 in that the file name is included instead of the file ID. This is because file IDs are converted into file names through the process performed by the conversion unit 45.

For example, the same file ID "0x1212" is recorded as the file IDs in the first, second, fourth, and fifth lines in FIG. 4. In contrast, in FIG. 5, the file name in the data in the first and second lines, which is "AAAAA", is different from the file name in the data in the fourth and fifth lines, which is "CCCCC". The association between a file ID and a file name may be changed between the time point of capture of the data in the second line and the time point of capture of the data in the fourth line. That is, in the example illustrated in FIG. 4, the same file ID is recorded for different files. Therefore, when the data illustrated in FIG. 4 is presented to an administrator, it is difficult for the administrator to identify the files.

In contrast, data illustrated in FIG. 5 includes the file name. Therefore, when an administrator refers to the data, the administrator easily recognizes which piece of data indicates which file. Therefore, the packet analysis apparatus according to the embodiments facilitates grasping the system state, improving the convenience of customers.

Exemplary Management Information According to a First Embodiment

FIG. 6 is a diagram illustrating exemplary management information obtained when capture is to be started, according to a first embodiment. In the management information, the file name, the file ID, the file server ID, and the registration time are recorded in association with one another. When there is only one file server 1, the file server ID is not necessarily recorded. The file server ID is exemplary second identification information.

The "file ID" and the "file name" are recorded based on a list of pairs of a file ID and a file name which are obtained from the file server 1 by the acquisition unit 42.

In the example illustrated in FIG. 6, the "file server ID" is the IP address of the file server 1. The file server ID is not limited to an IP address. The file server ID may be, for example, the MAC address of the file server 1.

The "time" represents, for example, a time at which the acquisition unit 42 acquires a list of pairs of a file ID and a file name, from the file server 1 through the communication unit 41. The "time" may represent, for example, a time at which the acquisition unit 42 requests a list of pairs of a file ID and a file name from the file server 1 through the communication unit 41.

The file server 1 gives a file ID to a file, for example, when the client terminal 2 opens the file. That is, when the client terminal 2 opens a file, a file ID is associated with the file name. The association between a file ID and a file name is terminated when the file is closed. The file ID with which the association has been terminated may be given to another file. Even when the same file is opened again, the same file ID as the previous ID is not necessarily given to the file.

FIG. 7 is a diagram illustrating exemplary management information obtained after start of capture, according to the first embodiment. FIG. 7 illustrates management information obtained after elapse of a given time from the start of capture. The management information illustrated in FIG. 7 is different from the management information illustrated in FIG. 6 in that an entry in which the time is "11:00" and an entry in which the time is "12:00" are added.

For example, in the example illustrated in FIG. 7, the file ID "0x1212" is used for the file whose file name is "AAAAA" and a file whose file name is "CCCCC". That is, the file ID is reused.

The file whose file name is "BBBBB" was associated with the file ID "0x2521" at 10:00, and was associated with the file ID "0x3105" at 11:00. That is, the file whose file name is "BBBBB" was closed. When the file was opened again, the different file ID was given.

The conversion unit 45 specifies the corresponding file name from the management information based on the file ID, the file server ID, and the capture time which are included in the reference target data stored in the storage unit 46.

The "time" in an added entry represents a time at which an instruction to open a file is obtained (captured). As described above, the file ID is associated with the file name when a file is opened. Therefore, for example, the file ID "0x1212" is highly likely to have been associated with the file name "AAAAA" from 10:00 to 12:00. Therefore, when multiple entries which correspond to a file ID and a file server ID which are included in the reference target data are present in the management information, the conversion unit 45 selects an entry in which the time indicates the latest time before the capture time of the reference target data.

For example, assume that a file ID included in the reference target data is "0x1212"; the corresponding file server ID is "192.168.0.1"; and the capture time is "10:30". In the management information, there are two entries which correspond to the file ID and the file server ID which are included in the reference target data (an entry whose registration time is "10:00", and an entry whose registration time is "12:00"). In this case, the conversion unit 45 selects the entry including "10:00" which is the latest time before the capture time, and specifies "AAAAA" as the file name.

Exemplary Flow of a Capture Process According to the First Embodiment

Figure 8:
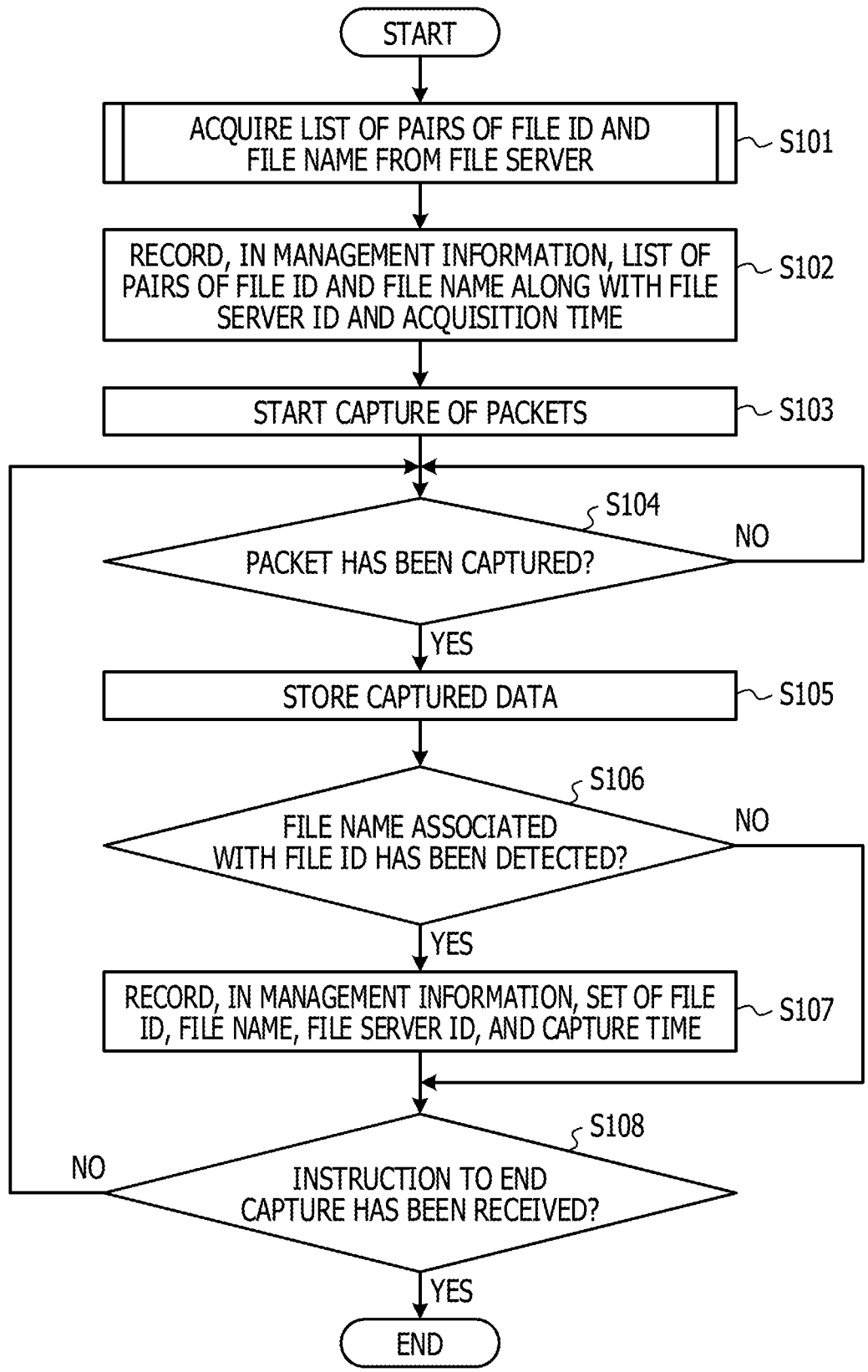
FIG. 8 is a flowchart of an exemplary capture process according to the first embodiment.

FIG. 8 is a flowchart of an exemplary capture process according to the first embodiment. When multiple sets of a file server 1, a client terminal 2, and a relay apparatus 3 are present, the data analysis apparatus 4 performs, on each set, the process illustrated in FIG. 8.

The acquisition unit 42 acquires, from the file server 1, a list of pairs of a file ID and a file name (S101). The process in S101 will be described in detail below.

The acquisition unit 42 records, in the management information, the obtained list of pairs of a file ID and a file name along with the file server ID and the acquisition time (S102).

The capture unit 43 starts capture of data transmitted between the file server 1 and the client terminal 2 (S103). The data analysis apparatus 4 may perform the processes in S101 and S102 in parallel with the process in S103. The data analysis apparatus 4 may perform the processes in S101 and S102 just after the process in S103.

If the capture unit 43 captures a packet (YES in S104), the capture unit 43 stores, in the storage unit 46, the data in the captured packet (S105). If the determination result is NO in S104, the process does not proceed to the next step.

The detection unit 44 determines whether or not a file ID and a file name associated with the file ID may be detected, based on the captured packet and other packets captured before (S106). For example, when a first packet for transmitting a notification about a file ID is captured, the detection unit 44 determines whether or not a second packet to which the same transaction ID as the first packet is given has been captured before, and is stored in the storage unit 46. When the second packet stored in the storage unit 46 includes an instruction to open a file by specifying a file name, the detection unit 44 detects the association between a file ID and a file name.

The first packet for transmitting a notification about a file ID is, for example, a packet illustrated in the second line in the example in FIG. 3. The second packet including an instruction to open a file by specifying a file name is, for example, a packet illustrated in the first line in the example in FIG. 3.

If the determination result is YES in S106, the detection unit 44 detects the file ID and the file name associated with the file ID. The detection unit 44 records, in the management information, the set of the file ID, the file name, the file server ID, and the time (capture time) (S107).

If the determination result is NO in S106 or the process in S107 has been processed, the controller 47 determines whether or not an instruction to end capture has been received from the management terminal 5 (S108). If the determination result is YES in S108, the controller 47 ends the process. If the determination result is NO in S108, the process returns to S104.

As described above, the data analysis apparatus 4 records pairs of a file ID and a file name when capture is to be started (S102). The data analysis apparatus 4 records a new pair of the file ID and the file name from captured packets (S107). Therefore, independently of the timing of start of the capture, the data analysis apparatus 4 may store pairs of a file ID and a file name. Even when the association between a file ID and a file name is changed, the data analysis apparatus 4 may obtain a new set of a file ID and a file name.

Figure 9:
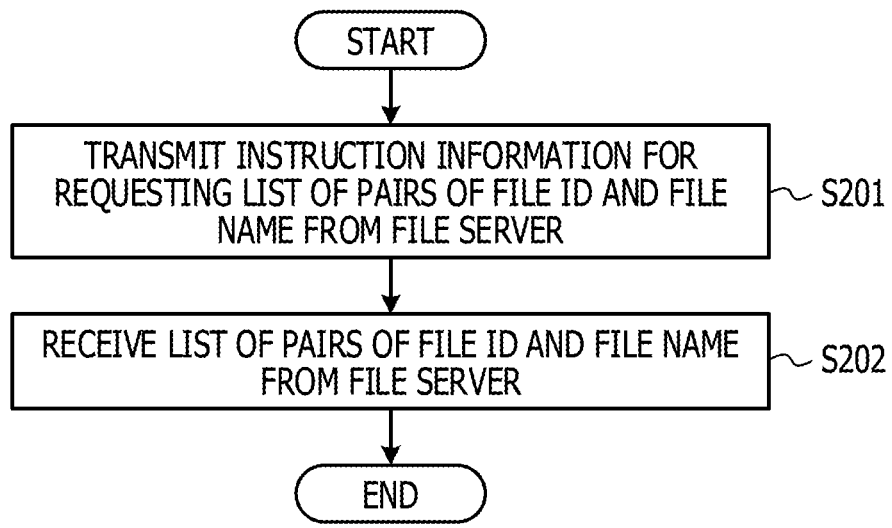
FIG. 9 is a flowchart of an exemplary process in S101 in FIG. 8.

FIG. 9 is a flowchart of an exemplary process in S101 in FIG. 8. For example, the acquisition unit 42 transmits instruction information for requesting a list of pairs of a file ID and a file name from the file server 1 through the communication unit 41 (S201). For example, the storage unit 46 may store IP address information of the file server 1 in advance. The communication unit 41 may transmit the instruction information by using the IP address information.

The acquisition unit 42 receives a list of pairs of a file ID and a file name from the file server 1 through the communication unit 41 (S202).

Figure 10:
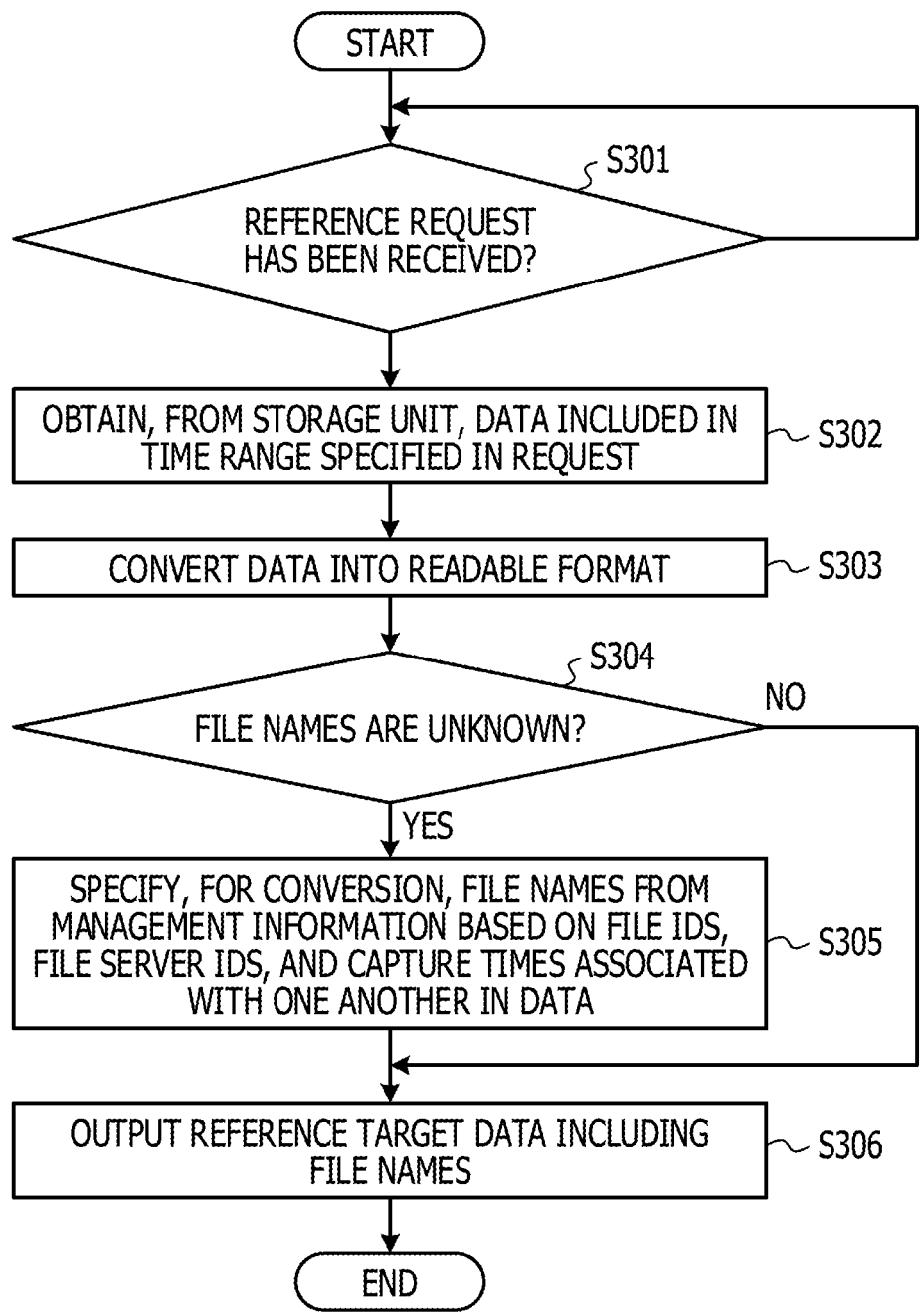
FIG. 10 is a flowchart of an exemplary reference process.

FIG. 10 is a flowchart of an exemplary reference process. The conversion unit 45 determines whether or not a reference request for referring to data stored in the storage unit 46 has been received from the management terminal 5 (S301). If the determination result is NO in S301, the process does not proceed to the next step.

If the determination result is YES in S301, the conversion unit 45 obtains, from the storage unit 46, data included in the time range specified in the reference request (S302). The data stored in the storage unit 46 is data stored on a packet-by-packet basis. Therefore, the data may be unreadable. For example, if a single file is divided into multiple packets which are stored in the storage unit 46, the data in each packet may be binary data which is unreadable. Therefore, the conversion unit 45 converts, into a readable format, the data stored on a packet-by-packet basis (S303).

The conversion unit 45 determines whether or not file names corresponding to the converted reference target data are unknown (S304). In the example in FIG. 4, all of the data does not include file names. Therefore, the determination result is YES in S304. For example, if the file names for the reference target data have been specified due to a past response to another reference request, the determination result is NO in S304.

If the determination result is YES in S304, the conversion unit 45 specifies corresponding file names from the management information based on the file IDs, the file server IDs, and the capture times which are associated with one another in the data in the storage unit 46, and converts the file IDs into the file names (S305).

The communication unit 41 outputs the reference target data in which the file IDs have been converted into the file names (S306). For example, the communication unit 41 transmits, to the management terminal 5, the reference target data in which the file IDs have been converted into the file names. The data analysis apparatus 4 may cause, for example, a display apparatus (not illustrated) to display the reference target data in which the file IDs have been converted into the file names.

As described above, in the process in FIG. 10, the data analysis apparatus 4 stores pairs of a file ID and a file name independently of the timing of start of capture. Therefore, in response to a reference request from the management terminal 5, the data analysis apparatus 4 may specify file names corresponding to captured data independently of the timing of start of capture.

Exemplary Flow of a Capture Process According to a Second Embodiment

Figure 11:
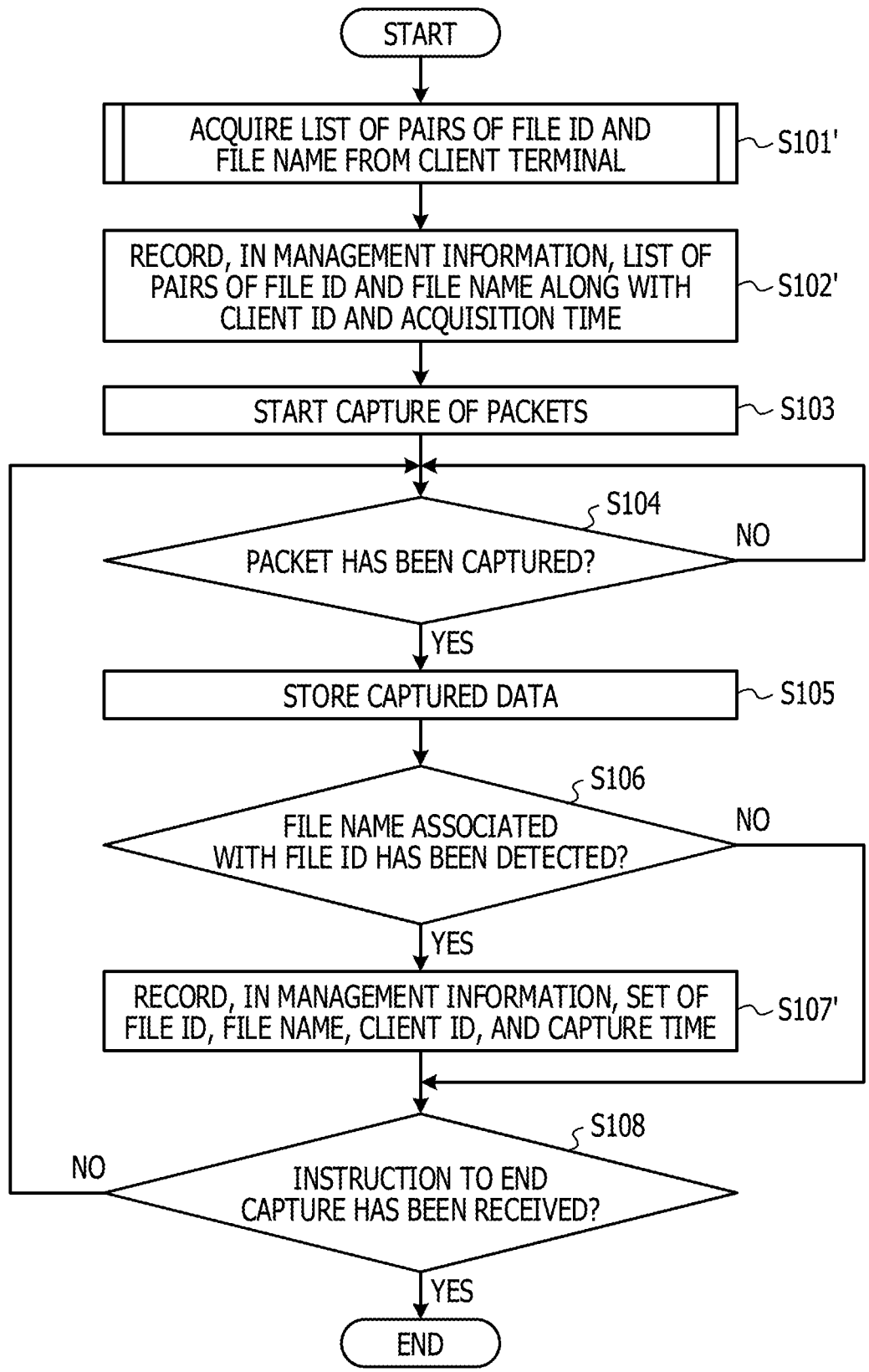
FIG. 11 is a flowchart of an exemplary capture process according to a second embodiment.

FIG. 11 is a flowchart of an exemplary capture process according to a second embodiment. In the process in FIG. 11, S103 to S106 and S108 are the same as those according to the first embodiment in FIG. 8, and will not be described.

The acquisition unit 42 acquires pairs of a file ID and a file name from the client terminal 2 (S101'). The process in S101' will be described in detail below.

The acquisition unit 42 records, in the management information, the obtained list of pairs of a file ID and a file name along with the client ID and the acquisition time (S102). The client ID is, for example, the IP address of the client terminal 2 obtained in acquisition of packets. The client ID is exemplary third identification information.

If the determination result is YES in S106, the detection unit 44 detects the file ID and the file name associated with the file ID. The detection unit 44 records, in the management information, the set of the file ID, the file name, the client ID, and the time (capture time) (S107').

Figure 12:
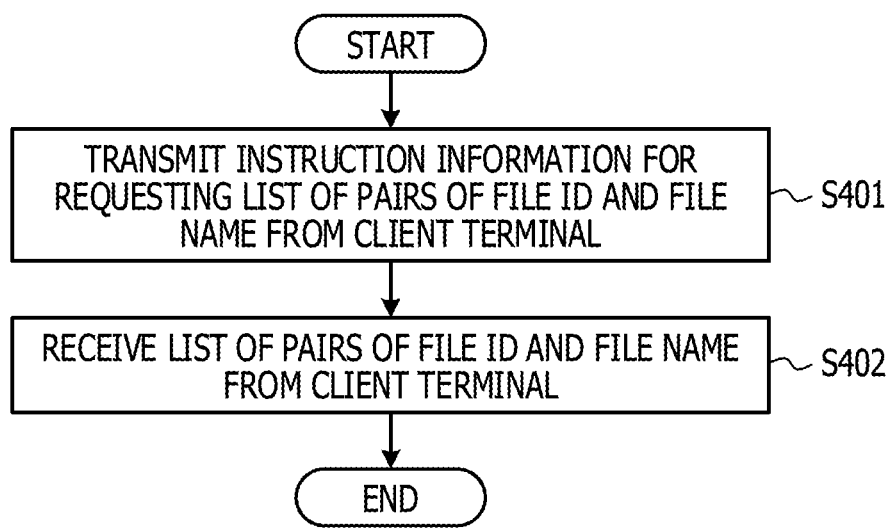
FIG. 12 is a flowchart of an exemplary process in S101' in FIG. 11.

FIG. 12 is a flowchart of an exemplary process in S101' in FIG. 11. For example, the acquisition unit 42 transmits instruction information for requesting a list of pairs of a file ID and a file name from the client terminal 2 through the communication unit 41 (S401). For example, the storage unit 46 may store IP address information of the client terminal 2 in advance, and the communication unit 41 may transmit the instruction information by using the IP address information.

The acquisition unit 42 receives a list of pairs of a file ID and a file name from the client terminal 2 through the communication unit 41 (S402).

As described above, the data analysis apparatus 4 according to the second embodiment obtains a list of pairs of a file ID and a file name from the client terminal 2. For example, when the client terminal 2 does not have a function of outputting pairs of a file ID and a file name, this function is added. The client terminal 2 is highly unlikely to operate all the time. Therefore, for example, when the function is to be added, different software may be stopped or restarted, facilitating addition of the function.

Exemplary Management Information According to the Second Embodiment

FIG. 13 is a diagram illustrating exemplary management information according to the second embodiment. The management information illustrated in FIG. 13 is different from the management information in FIG. 7 in that the client ID is included instead of the file server ID.

The "client ID" is, for example, the IP address of a client terminal 2 in the example in FIG. 13. The client ID is not limited to the IP address. The client ID may be, for example, the MAC address of the client terminal 2.

The "time" represents, for example, a time at which the acquisition unit 42 receives a list of pairs of a file ID and a file name from the client terminal 2 through the communication unit 41. The "time" represents, for example, a time at which the acquisition unit 42 transmits instruction information for requesting a list of pairs of a file ID and a file name from the client terminal 2 through the communication unit 41. The "time" recorded after start of capture represents a capture time.

Exemplary Flow of a Capture Process According to a Third Embodiment

Figure 14:
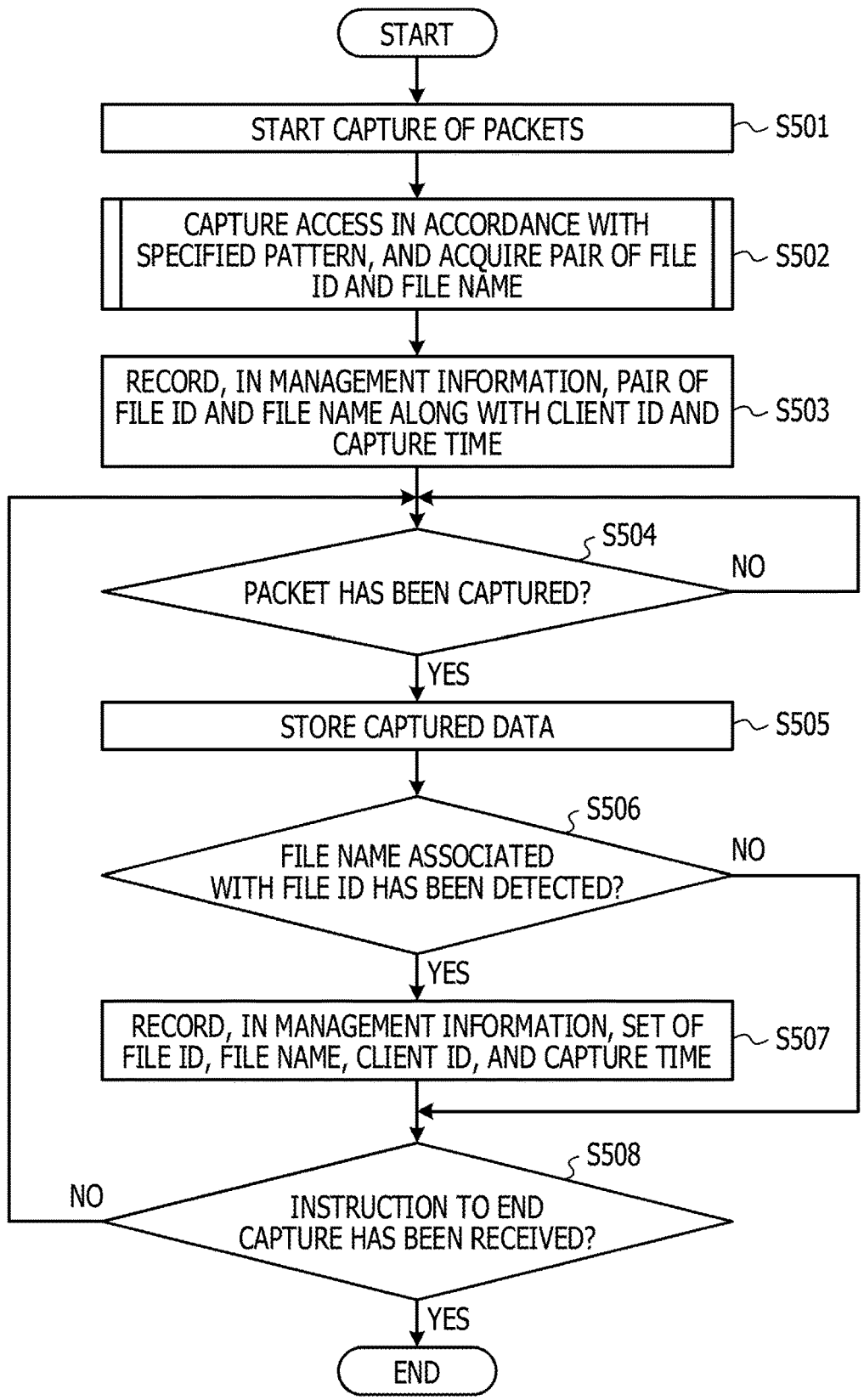
FIG. 14 is a flowchart of an exemplary capture process according to a third embodiment.

FIG. 14 is a flowchart of an exemplary capture process according to a third embodiment. In the process in FIG. 14, S504 to S508 are the same as S104 to S108 according to the second embodiment in FIG. 11, and will not be described.

The acquisition unit 42 starts capture of data transmitted between the file server 1 and the client terminal 2 (S501).

The acquisition unit 42 captures access in accordance with a specified pattern, and obtains a pair of a file ID and a file name (S502). The process in S502 will be described in detail below.

The acquisition unit 42 records, in the management information, the pair of a file ID and a file name along with the client server ID and the capture time (acquisition time) (S503).

Figure 15:
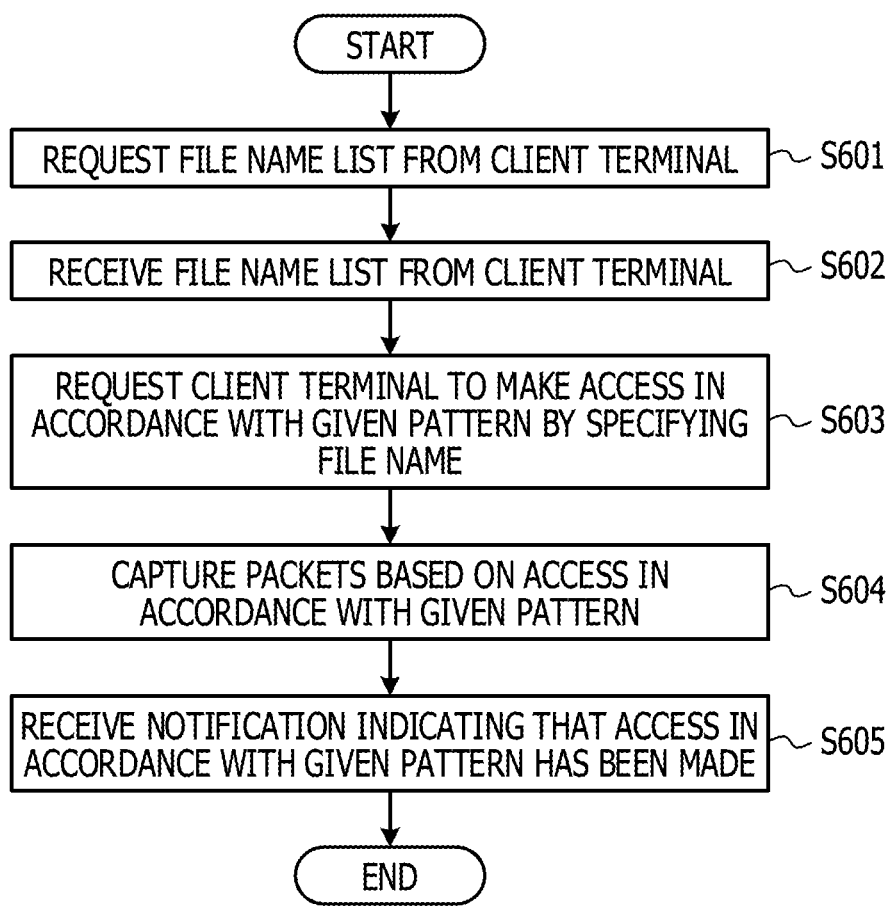
FIG. 15 is a flowchart of an exemplary process in S502 in FIG. 14.

FIG. 15 is a flowchart of an exemplary process in S502 in FIG. 14. The acquisition unit 42 transmits instruction information for requesting a file name list from the client terminal 2 through the communication unit 41 (S601). The acquisition unit 42 receives the file name list from the client terminal 2 through the communication unit 41 (S602).

The acquisition unit 42 transmits, through the communication unit 41, instruction information for requesting the client terminal 2 to make access in accordance with the given pattern by specifying any file name included in the file name list (S603). The acquisition unit 42 captures packets transmitted from the client terminal 2 to the file server 1 based on the access in accordance with the given pattern (S604).

The acquisition unit 42 receives a notification indicating that access in accordance with the given pattern has been made, from the client terminal 2 through the communication unit 41 (S605).

Access in accordance with the given pattern indicates, for example, an instruction, which includes a file ID, to read the file corresponding to the specified file name. When the acquisition unit 42 captures packets based on the access in accordance with the given pattern, the acquisition unit 42 determines that the specified file name corresponds to the file ID in the captured packets. The access in accordance with the given pattern is not limited to an instruction to read a file, and may be different access for transmitting packets including a file ID.

As described above, the data analysis apparatus 4 according to the third embodiment captures access in accordance with the given pattern based on an instruction, obtaining a pair of a file ID and a file name. Therefore, even when the file server 1 and the client terminal 2 do not have a function of outputting a list of pairs of a file ID and a file name, the data analysis apparatus 4 according to the third embodiment may obtain a pair of a file ID and a file name.

Exemplary Access in Accordance with the Given Pattern According to the Third Embodiment FIG. 16 is a diagram illustrating exemplary access in accordance with the given pattern according to the third embodiment. The data format illustrated in FIG. 16 is similar to the data format illustrated in FIG. 3. In the data in FIG. 16, "A" represents identification information of the client terminal 2, and "B" represents identification information of the file server 1. In the data in FIG. 16, access from "A" to "B" indicates the access in accordance with the given pattern.

For example, the client terminal 2 reads 1024-byte data from the file whose file ID is "0123456", by using the 0-byte position as a start position. The client terminal 2 reads 128-byte data from the file whose file ID is "0123456", by using the 1024-byte position as a start position. The client terminal 2 reads 256-byte data from the file whose file ID is "0123456", by using the 2048-byte position as a start position.

That is, in the example in FIG. 16, access in accordance with the given pattern, which is indicated by an instruction given from the data analysis apparatus 4, indicates three instructions, in total, to read a file, each of which includes an offset and an access length. The access in accordance with the given pattern illustrated in the example in FIG. 16 includes multiple access conditions. Therefore, confusion with spontaneous access performed by the client terminal 2 may be inhibited.

Exemplary Flow of a Capture Process According to a Fourth Embodiment

Figure 17:
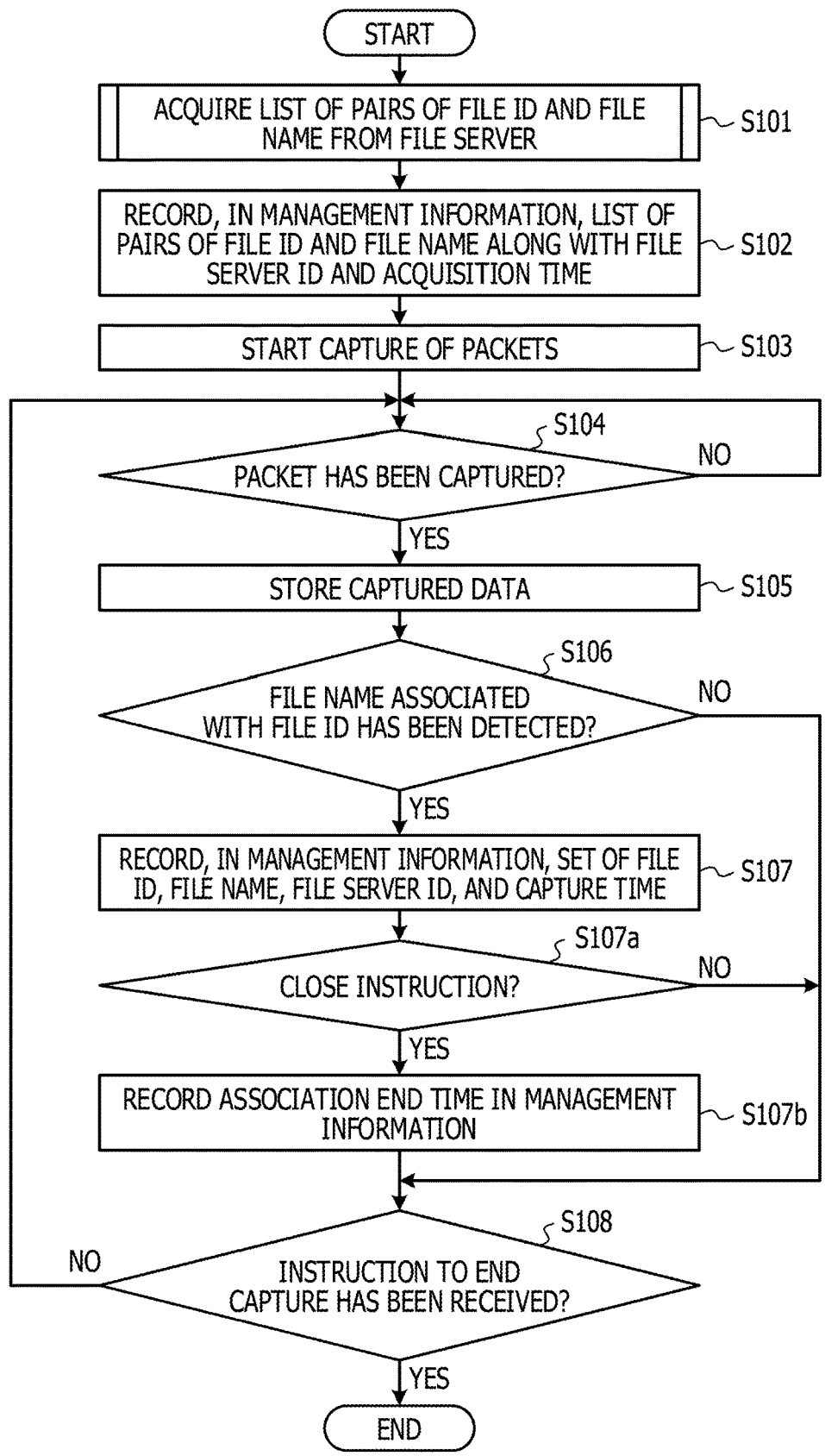
FIG. 17 is a flowchart of an exemplary capture process according to a fourth embodiment.

FIG. 17 is a flowchart of an exemplary capture process according to a fourth embodiment. In the process in FIG. 17, S101 to S107 and S108 are the same as those in the process according to the first embodiment in FIG. 8, and will not be described.

The controller 47 determines whether or not an instruction to close a given file (CLOSE instruction) is included in the data in the captured packet (S107a). An instruction to close a given file includes the target file ID.

If the determination result is YES in S107a, the controller 47 records the time, at which the CLOSE instruction is captured, as an association end time in the management information in association with the file ID of the given file (S107b). This is because, as described above, when a file is closed, the association between a file ID and a file name is terminated. For example, the controller 47 searches the management information for an entry including the file ID included in the instruction to close a file and the file server ID which is the transmission destination. The controller 47 records the association end time in the found entry.

The process according to the fourth embodiment illustrated in FIG. 17 may be a process in which S107a and S107b are added after S107' in FIG. 11. Alternatively, the process according to the fourth embodiment may be a process in which S107a and S107b are added after S507 in FIG. 14.

Exemplary Management Information According to the Fourth Embodiment

FIG. 18 is a diagram illustrating exemplary management information according to the fourth embodiment. In the management information, the file name, the file ID, the file server ID, the registration time, and the association end time are recorded in association with one another. The registration time corresponds to the "time" in the examples in FIGS. 6 and 7.

The conversion unit 45 specifies the corresponding file name from the management information based on a file ID, a file server ID, and a capture time included in the reference target data stored in the storage unit 46. When multiple entries corresponding to the file ID and the file server ID which are included in the reference target data are present in the management information, the conversion unit 45 selects an entry in which the capture time is between the registration time and the association end time.

When the end time is not recorded, the conversion unit 45 performs the process according to the first embodiment. That is, when multiple entries corresponding to a file ID and a file server ID which are included in the reference target data are present in the management information, the conversion unit 45 selects an entry having the latest registration time among the registration times before the capture time.

For example, assume that a file ID included in the reference target data is "0x1212"; a file server ID is "192.168.0.1"; and the capture time is "10:30". The time "10:30" is between the registration time "10:00" and the association end time "11:21" in the first entry. Therefore, the conversion unit 45 specifies "AAAAA" recorded in the first entry as the file name, and converts the file ID "0x1212" included in the reference target data, into the file name "AAAAA".

For example, assume that a file ID included in the reference target data is "0x1212"; a file server ID is "192.168.0.1"; and the capture time is "12:30". The time "12:30" is not between the registration time "10:00" and the association end time "11:21" in the first entry. In contrast, the registration time of the fourth entry is "12:00", and is the latest registration time among the registration times before the capture time "12:30". Therefore, the conversion unit 45 specifies "CCCCC" recorded in the fourth entry as the file name, and converts the file ID "0x1212" included in the reference target data into the file name "CCCCC".

In the management information illustrated in FIG. 18, there are two entries whose file ID is "0x1212" and whose file server ID is "192.168.0.1". However, when the management information includes the association end time, the conversion unit 45 may specify the file name by referring only to the first entry as described above. Therefore, the data analysis apparatus 4 according to the fourth embodiment may achieve further increases in speed of the process of specifying the file name.

Exemplary Process Flow According to a Fifth Embodiment

A fifth embodiment describes a process performed when a new set of a file server 1, a client terminal 2, and a relay apparatus 3 is added.

Figure 19:
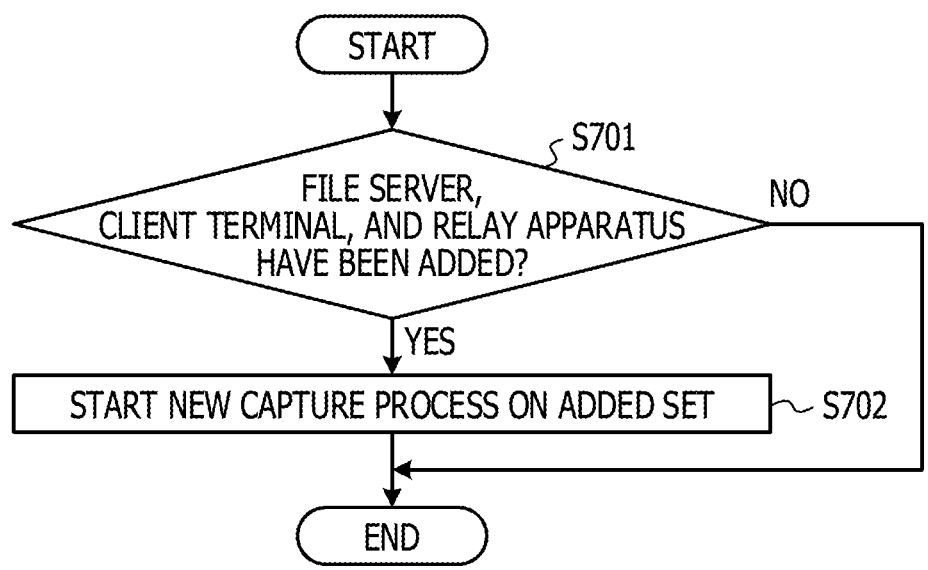
FIG. 19 is a flowchart of an exemplary process according to a fifth embodiment.

FIG. 19 is a flowchart of a process according to the fifth embodiment. The controller 47 determines whether or not a set of a file server 1, a client terminal 2, and a relay apparatus 3 has been added to the system (S701). For example, the controller 47 determines whether or not information indicating that a set of a file server 1, a client terminal 2, and a relay apparatus 3 has been added to the system has been transmitted from the management terminal 5. If the determination result is NO in S701, the controller 47 ends the process.

If the determination result is YES in S701, the controller 47 starts a new capture process on the added set of a file server 1, a client terminal 2, and a relay apparatus 3 (S702). The capture process started in S702 is one of the processes in FIGS. 8, 11, 14, and 17.

When a set of a file server 1, a client terminal 2, and a relay apparatus 3 has been added to the system, the communication unit 41 may receive IP address information of the file server 1, the client terminal 2, and the relay apparatus 3 from the management terminal 5. The received IP address information is stored in the storage unit 46, and is used in communication in the capture process.

Even when a new set of a file server 1, a client terminal 2, and a relay apparatus 3 is added, the data analysis apparatus 4 according to the fifth embodiment may automatically start the capture process.

Exemplary Hardware Configuration of the Data Analysis Apparatus

Figure 20:
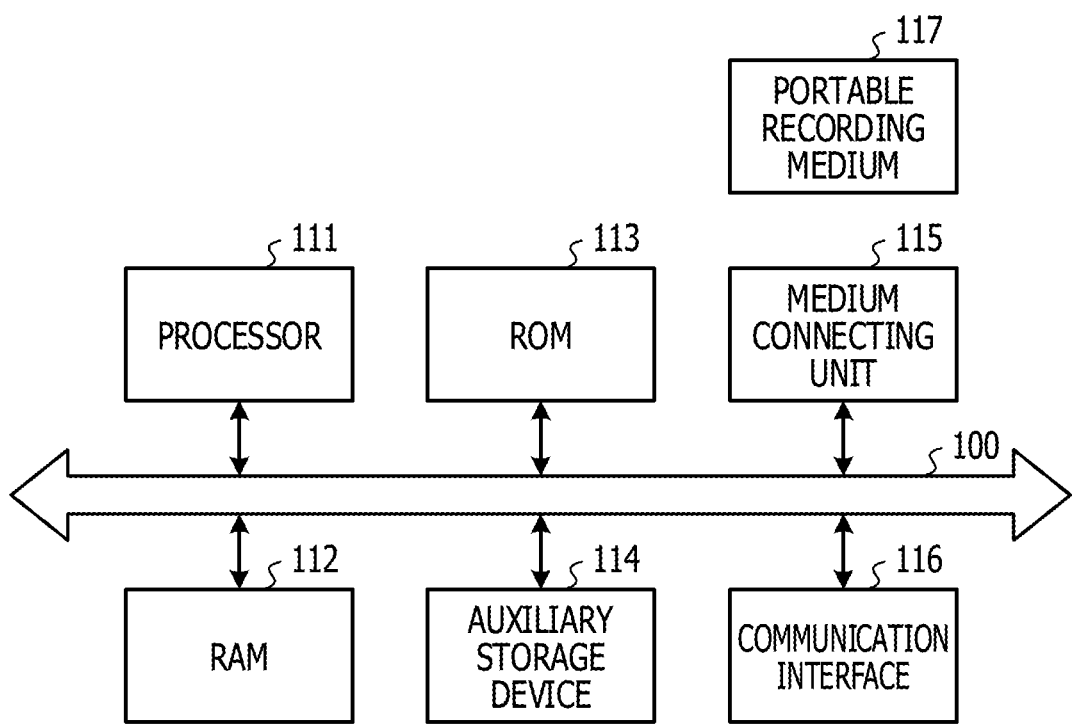
FIG. 20 is a diagram illustrating an exemplary hardware configuration of a data analysis apparatus.

By referring to the example in FIG. 20, an exemplary hardware configuration of the data analysis apparatus 4 will be described. As illustrated in the example in FIG. 20, a processor 111, a random access memory (RAM) 112, and a read only memory (ROM) 113 are connected to a bus 100. An auxiliary storage device 114, a medium connecting unit 115, and a communication interface 116 are connected to the bus 100.

The processor 111 executes programs loaded in the RAM 112. As the programs to be executed, a data analysis program for performing the processes according to the embodiments may be used.

The ROM 113 is a nonvolatile storage device storing programs loaded in the RAM 112. The auxiliary storage device 114 is a storage device storing various types of information. As the auxiliary storage device 114, for example, a hard disk drive or a semiconductor memory may be used. In the auxiliary storage device 114, the data analysis program for performing the processes according to the embodiments may be recorded.

The medium connecting unit 115 may be connected to a portable recording medium 117. As the portable recording medium 117, for example, a portable memory, an optical disk (for example, a compact disc (CD) or a digital versatile disc (DVD)), or a semiconductor memory may be used. In the portable recording medium 117, the data analysis program for performing the processes according to the embodiments may be recorded.

The storage unit 46 illustrated in FIG. 2 may be implemented by using the RAM 112, the auxiliary storage device 114, or the like. The communication unit 41 illustrated in FIG. 2 may be implemented by using the communication interface 116. The acquisition unit 42, the capture unit 43, the detection unit 44, and the conversion unit 45 illustrated in FIG. 2 may be implemented by the processor 111 executing the provided data analysis program.

Each of the RAM 112, the ROM 113, the auxiliary storage device 114, and the portable recording medium 117 is an exemplary computer-readable tangible storage medium. The tangible storage medium is not a transitory medium such as a signal carrier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a program that causes a computer to execute a process comprising:
    acquiring a plurality of pairs respectively includes first identification information that identifies a file and a file name of the file from a file server;
    recording the plurality of acquired pairs in management information stored in a memory, the management information being information in which the first identification information, the file name and an acquisition time of the first identification information are associated with each other for each of the plurality of first identification information;
    capturing a packet to be communicated between the file server and a terminal device;
    recording a pair of the first identification information and the file name included in the captured packet and a capture time of the captured packet in the memory;
    detecting that the first identification information included in the captured packet is associated with the file name included in another packet captured before the captured packet;
    extracting the first identification information and the file name from the another packet stored in the memory;
    recording the extracted first identification information and the extracted file name in the management information in association with the capture time of the captured packet;
    receiving a reference request for data;
    acquiring the data included in a time range specified in the reference request;
    specifying a file name corresponding to the first identification information of the data from the management information; and
    outputting the data in which the first identification information is converted into the specified file name.

2. The non-transitory computer-readable storage medium according to claim 1,
    wherein the acquiring includes acquiring a list of the plurality of pairs from the file server storing at least one file, and
    wherein the recording the plurality of acquired pairs includes recording the plurality of acquired pairs along with the acquisition time and second identification information for identifying the file server.

3. The non-transitory computer-readable storage medium according to claim 1,
    wherein the acquiring includes the plurality of pairs from a client terminal configured to communicate with the file server storing at least one file, and
    wherein the recording the plurality of acquired pairs includes recording the plurality of acquired pairs along with the acquisition time and third identification information for identifying the client terminal.

4. The non-transitory computer-readable storage medium according to claim 3,
    wherein the file server and the client terminal are included in a system, and the process further comprises:
    detecting that another file server different from the file server and another client terminal different from the client terminal and configured to communicate with the another file server are added to the system, and
    starting a new process of capturing a packet to be communicated between the another file server and the another client terminal.

5. The non-transitory computer-readable storage medium according to claim 1, wherein
    the acquiring includes acquiring a list of file names from a client terminal configured to communicate with the file server storing at least one file, and
    the process further comprising:
    requesting, from the client terminal, access to a file by specifying a given file name, the access being made in accordance with a given pattern, the file being provided with the given file name;
    capturing data based on the access in accordance with the given pattern; and
    recording, in the management information, a pair of first identification information and the specified file name along with a capture time, the first identification information being included in the captured data.

6. The non-transitory computer-readable storage medium according to claim 1,
    wherein the captured packet includes an instruction to close a given file, and
    the process further comprises
    recording, in the management information, a capture time in association with the first identification information of the given file, the capture time being a time at which the packet is captured.

7. The non-transitory computer-readable storage medium according to claim 1,
    wherein the reference request includes time information indicating a time range in which the packet is captured, and
    the extracting includes specifying the file name corresponding to the first identification information and the time information of the data included in the reference request.

8. The non-transitory computer-readable storage medium according to claim 1,
    wherein the file server is coupled to the client terminal through a relay apparatus, and
    the capturing includes receiving the packet from the relay apparatus that mirrored the packet communicated between the file server and the client terminal.

9. A data analysis apparatus, comprising:
    a memory stores instructions, and a processor, the instructions executed by the processor perform:

acquiring a plurality of pairs respectively includes first identification information that identifies a file and a file name of the file from a file server;
recording the plurality of acquired pairs in management information stored in the memory, the management information being information in which the first identification information, the file name and an acquisition time of the first identification information are associated with each other for each of the plurality of first identification information;
capturing a packet to be communicated between the file server and a terminal device;
recording a pair of the first identification information and the file name included in the captured packet and a capture time of the captured packet in the memory;
detecting that the first identification information included in the captured packet is associated with the file name included in another packet captured before the captured packet;
extracting the first identification information and the file name from the another packet stored in the memory;
recording the extracted first identification information and the extracted file name in the management information in association with the capture time of the captured packet;
receiving a reference request for data;
acquiring the data included in a time range specified in the reference request;
specifying a file name corresponding to the first identification information of the data from the management information; and
outputting the data in which the first identification information is converted into the specified file name.

10. The data analysis apparatus according to claim 9, wherein the processor is configured to:
acquire a list of the plurality of pairs from the file server storing at least one file, and
record the plurality of acquired pairs along with the acquisition time and second identification information for identifying the file server.

11. The data analysis apparatus according to claim 9, wherein the processor is configured to:
acquire the plurality of pairs from a client terminal configured to communicate with the file server storing at least one file, and
record, the plurality of acquired pairs along with the acquisition time and third identification information for identifying the client terminal.

12. The data analysis apparatus according to claim 9, wherein the processor is configured to:
acquire a list of file names from a client terminal configured to communicate with the file server storing at least one file,
request, from the client terminal, access to a file by specifying a given file name, the access being made in accordance with a given pattern, the file being provided with the given file name,
capture data based on the access in accordance with the given pattern, and
record, in the management information, a pair of first identification information and the specified file name along with a capture time, the first identification information being included in the captured data.

13. The data analysis apparatus according to claim 9,
wherein the captured packet includes an instruction to close a given file, and
the processor is configured to record, in the management information, a capture time in association with the first identification information of the given file, the capture time being a time at which the packet is captured.

14. The data analysis apparatus according to claim 9,
wherein the file server and the client terminal are included in a system, and
the processor is configured to:
detect that another file server different from the file server and another client terminal different from the client terminal and configured to communicate with the another file server are added to the system, and
start a new process of capturing a packet to be communicated between the another file server and the another client terminal.

15. The data analysis apparatus according to claim 9,
wherein the reference request includes time information indicating a time range in which the packet is captured, and
the processor is configured to specify the file name corresponding to the first identification information and the time information of the data included in the reference request.

16. A content verification method performed by a processor of a data analysis apparatus, the method comprising:
acquiring a plurality of pairs respectively includes first identification information that identifies a file and a file name of the file from a file server;
recording the plurality of acquired pairs in management information stored in a memory, the management information being information in which the first identification information, the file name and an acquisition time of the first identification information are associated with each other for each of the plurality of first identification information;
capturing a packet to be communicated between the file server and a terminal device;
recording a pair of the first identification information and the file name included in the captured packet and a capture time of the captured packet in the memory;
detecting that the first identification information included in the captured packet is associated with the file name included in another packet captured before the captured packet;
extracting the first identification information and the file name from the another packet stored in the memory;
recording the extracted first identification information and the extracted file name in the management information in association with the capture time of the captured packet;
receiving a reference request for data;
acquiring the data included in a time range specified in the reference request;
specifying a file name corresponding to the first identification information of the data from the management information; and
outputting the data in which the first identification information is converted into the specified file name.

* * * * *